United States Patent
Calder et al.

(10) Patent No.: US 9,996,572 B2
(45) Date of Patent: *Jun. 12, 2018

(54) PARTITION MANAGEMENT IN A PARTITIONED, SCALABLE, AND AVAILABLE STRUCTURED STORAGE

(75) Inventors: Bradley Gene Calder, Bellevue, WA (US); Ju Wang, Redmond, WA (US); Arild E. Skjolsvold, Kenmore, WA (US); Shashwat Srivastav, Seattle, WA (US); Niranjan Nilakantan, Redmond, WA (US); Deepali Bhardwaj, Snohomish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 361 days.

This patent is subject to a terminal disclaimer.

(21) Appl. No.: 12/258,050

(22) Filed: Oct. 24, 2008

(65) Prior Publication Data

US 2010/0106934 A1   Apr. 29, 2010

(51) Int. Cl.
*G06F 7/00* (2006.01)
*G06F 17/30* (2006.01)
*G06F 3/06* (2006.01)

(52) U.S. Cl.
CPC ...... *G06F 17/30339* (2013.01); *G06F 3/0605* (2013.01); *G06F 3/067* (2013.01); *G06F 3/0644* (2013.01); *G06F 2201/86* (2013.01)

(58) Field of Classification Search
USPC .......................... 707/687, 705, 790, 702, 720
See application file for complete search history.

(56) References Cited

U.S. PATENT DOCUMENTS

| | | | |
|---|---|---|---|
| 5,313,629 A | | 5/1994 | Abraham et al. |
| 5,341,308 A | * | 8/1994 | Mendel ............... G06F 17/5072 |
| | | | 716/125 |
| 5,761,500 A | * | 6/1998 | Gallant et al. |
| 5,765,166 A | * | 6/1998 | Gotfried ............... G01S 13/726 |
| | | | 342/190 |

(Continued)

FOREIGN PATENT DOCUMENTS

| | | |
|---|---|---|
| AU | 2009308176 B2 | 5/2014 |
| JP | 2006-526191 | 11/2006 |

(Continued)

OTHER PUBLICATIONS

EP Search Report dated Apr. 5, 2012 re EPC Appln. 09822458.7.

(Continued)

*Primary Examiner* — Eliyah S Harper
(74) *Attorney, Agent, or Firm* — Shook Hardy & Bacon L.L.P.

(57) ABSTRACT

Partition management for a scalable, structured storage system is provided. The storage system provides storage represented by one or more tables, each of which includes rows that represent data entities. A table is partitioned into a number of partitions, each partition including a contiguous range of rows. The partitions are served by table servers and managed by a table master. Load distribution information for the table servers and partitions is tracked, and the table master determines to split and/or merge partitions based on the load distribution information.

20 Claims, 8 Drawing Sheets

(56) References Cited

U.S. PATENT DOCUMENTS

| | | | |
|---|---|---|---|
| 5,909,681 A * | 6/1999 | Passera | G06F 9/5027 |
| 5,933,834 A | 8/1999 | Aichelen | |
| 5,946,685 A | 8/1999 | Cramer et al. | |
| 5,970,495 A | 10/1999 | Baru et al. | |
| 5,987,468 A | 11/1999 | Singh et al. | |
| 5,995,904 A * | 11/1999 | Willen | G06F 17/10 |
| | | | 702/14 |
| 6,014,656 A | 1/2000 | Hallmark | |
| 6,163,856 A | 12/2000 | Dion et al. | |
| 6,173,293 B1 | 1/2001 | Thekkath | |
| 6,230,151 B1 * | 5/2001 | Agrawal | G06F 8/453 |
| | | | 706/12 |
| 6,240,413 B1 | 5/2001 | Leamont | |
| 6,523,078 B1 | 2/2003 | Desai | |
| 6,536,024 B1 * | 3/2003 | Hathaway | G06F 1/10 |
| | | | 327/295 |
| 6,687,701 B2 | 2/2004 | Karamanolis et al. | |
| 6,697,846 B1 | 2/2004 | Soltis | |
| 7,035,851 B1 | 4/2006 | Sinclair | |
| 7,099,889 B2 | 8/2006 | Berks et al. | |
| 7,146,365 B2 | 12/2006 | Allen | |
| 7,165,096 B2 | 1/2007 | Soltis | |
| 7,197,490 B1 | 3/2007 | English | |
| 7,222,119 B1 | 5/2007 | Ghemawat et al. | |
| 7,240,060 B2 | 7/2007 | Adya et al. | |
| 7,281,031 B1 | 10/2007 | Wang et al. | |
| 7,299,239 B1 | 11/2007 | Basu | |
| 7,319,997 B1 | 1/2008 | Morris | |
| 7,359,923 B2 | 4/2008 | Beck | |
| 7,406,473 B1 | 7/2008 | Brassow et al. | |
| 7,650,336 B1 | 1/2010 | Hermann et al. | |
| 7,685,109 B1 * | 3/2010 | Ransil | G06F 17/30336 |
| | | | 707/999.003 |
| 7,844,851 B2 | 11/2010 | Cosmadopoulos et al. | |
| 7,987,166 B2 | 7/2011 | McKenney et al. | |
| 8,392,482 B1 * | 3/2013 | McAlister | G06F 17/30584 |
| | | | 707/771 |
| 2002/0184327 A1 | 12/2002 | Major et al. | |
| 2003/0041097 A1 | 2/2003 | Tormasov | |
| 2003/0195895 A1 * | 10/2003 | Nowicki | G06F 17/30067 |
| 2004/0003086 A1 | 1/2004 | Parham et al. | |
| 2004/0078658 A1 | 4/2004 | Park et al. | |
| 2004/0133570 A1 | 7/2004 | Soltis | |
| 2004/0133652 A1 | 7/2004 | Miloushev et al. | |
| 2004/0220940 A1 | 11/2004 | Berks et al. | |
| 2005/0114291 A1 | 5/2005 | Becker-Szendy et al. | |
| 2005/0289143 A1 | 12/2005 | Oshri et al. | |
| 2006/0004765 A1 | 1/2006 | Anderson et al. | |
| 2006/0039364 A1 | 2/2006 | Wright | |
| 2006/0218123 A1 * | 9/2006 | Chowdhuri | G06F 17/30445 |
| 2006/0277221 A1 * | 12/2006 | Zavisca et al. | 707/201 |
| 2007/0150436 A1 * | 6/2007 | Turkel | G06F 17/30427 |
| 2007/0156588 A1 | 7/2007 | Howell et al. | |
| 2007/0168336 A1 | 7/2007 | Ransil | |
| 2007/0192524 A1 | 8/2007 | Chan et al. | |
| 2007/0239791 A1 | 10/2007 | Cattell et al. | |
| 2007/0271438 A1 * | 11/2007 | Lee | G06F 3/0605 |
| | | | 711/173 |
| 2007/0276838 A1 | 11/2007 | Abushanab et al. | |
| 2007/0282798 A1 * | 12/2007 | Akilov | G06F 17/30595 |
| 2008/0027920 A1 | 1/2008 | Schipunov et al. | |
| 2008/0183991 A1 | 7/2008 | Cosmadopoulos et al. | |
| 2008/0201296 A1 | 8/2008 | Yu | |
| 2008/0215544 A1 | 9/2008 | Galindo-Legaria | |
| 2008/0270605 A1 | 10/2008 | Berstis et al. | |
| 2009/0076862 A1 * | 3/2009 | Patoureaux | G06F 17/30961 |
| | | | 705/5 |
| 2009/0077097 A1 * | 3/2009 | Lacapra | G06F 17/30079 |
| 2009/0100089 A1 * | 4/2009 | Eadon | G06F 17/30595 |
| 2009/0106255 A1 * | 4/2009 | Lacapra | G06F 11/1076 |
| 2009/0300091 A1 * | 12/2009 | Brokenshire | G06F 17/16 |
| | | | 708/607 |
| 2010/0082551 A1 * | 4/2010 | Kathuria | G06F 17/30433 |
| | | | 707/674 |
| 2010/0106934 A1 | 4/2010 | Calder et al. | |
| 2011/0276692 A1 | 11/2011 | Waldman et al. | |
| 2012/0011176 A1 | 1/2012 | Aizman | |

FOREIGN PATENT DOCUMENTS

| | | |
|---|---|---|
| JP | 2006-351040 | 12/2006 |
| KR | 1020060063425 A | 6/2006 |
| KR | 1020070111263 A | 11/2007 |
| TW | 583586 B | 4/2004 |
| TW | 200719147 | 5/2007 |
| WO | 2007001864 A1 | 1/2007 |
| WO | 2007079303 A2 | 7/2007 |
| WO | 2008121862 A1 | 10/2008 |

OTHER PUBLICATIONS

Tanenbaum, "Modern Operating Systems Passage" Modern Operating Systems, XX, XX, Jan. 1, 2001, pp. 386-389, XP002299689.
Tanenbaum, et al., "Distributed Operating Systems" ACM Computing Surveys, ACM, New York NY, US, vol. 17, No. 4, Dec. 1, 1985, pp. 419-470, XP002325197, ISSN 0360-0300, DOI: 10.1145/6041.6074.
Non Final Office Action dated Jan. 17, 2013 in U.S. Appl. No. 13/113,776, 24 pages.
Final Office Action dated Nov. 21, 2013 in U.S. Appl. No. 13/113,776, 27 pages.
Notice of Allowance in U.S. Appl. No. 13/113,776, dated Jul. 8, 2014, 20 pages.
"SQL Azure Achitecture—Competitive Differentiation", retrieved Dec. 29, 2010, http://www.infoq.com/news/2010/11/delaney-SQLAzure, 2 pages.
"Deployment Guidelines for Exchange Server Multi-Site Data Replication", retrieved Dec. 29, 2010, http://technet.microsoft.com/en-us/library/bb124066%28EXCHG.65%29.aspx, 6 pages.
"High Availability, Load Balancing, and Replication", Retrieved on : Dec. 29, 2010, 4 pages Available at: http://www.postgresql.org/docs/8.3/static/high-availability.html.
"Failover and Replication in a Cluster", retrieved Dec. 29, 2010, http://download.oracle.com/docs/cd/E13222_01/wls/docs81/cluster/failover.html, 14 pages.
"GEO LoadMaster Overview", retrieved Dec. 29, 2010, http://www.kemptechnologies.com/emea/server-load-balancing-appliances/geo-loadmaster/glm-overview.html, 1 page.
European Examination Report dated Jul. 21, 2014 in Application No. 09822458.7, 7 pages.
SAS Technical Paper, Scalability Solution for SAS Dynamic Cluster Tables: SAS Scalable Performance Data Server 4.3 and Later, Sep. 2007. Retrieved at May 13, 2010 from http://support.sas.com/rnd/scalability/papers/T59593.pdf.
International Search Report of PCT/US2009/0691972 dated, May 25, 2010.
Chang, Fay, et al., Bigtable: A Distributed Storage System for Structured Sat a' In: 7th Symposium on Operating Systems Design and Implementation (OSDI '06) Nov. 6-8, 2006.
"Office Action Received for Israel Patent Application No. 211627", dated Dec. 18, 2014, 4 Pages.
"Search Report Issued in European Patent Application No. 09822822.4", dated Apr. 8, 2016, 10 Pages.
"Office Action Issued in Malaysian Patent Application No. PI 2011001308", dated Mar. 15, 2016, 3 Pages.
Data Engineering, ftp://ftp.research.microsoft.com/pub/debull/juneA01-letfinal.ps.
Improving Performance: Accessing DB2 Data with SAS 9, http://www2.sas.com/proceedings/sugi29/107-29.pdf.
Ghemawat et al., The Google File System, http://www.cs.cornell.edu/Courses/cs614/2004sp/papers/gfs.pdf.
Right Scale Blog, Why Amazon's Elastic Block Store Matters, http://blog.rightscale.com/2008/08/20/why-amason-ebs-matters/, Aug. 20, 2008.
Amazon EBS—Elastic Block Store has launched—All Things Distributed, httb://www.allthingsdistributed.com/2008/08/amazon_ebs_elastic_block_store.html, Aug. 28, 2008.

(56) References Cited

OTHER PUBLICATIONS

Chang et al., Bigtable: A Distributed Storage System for Structured Data, labs.google.com/papers/bigtable-osdi06.pdf.
Non-Final Office Action dated Dec. 9, 2010 regarding U.S. Appl. No. 12/258,025 22 pages.
Final Office Action dated Dec. 9, 2010 regarding U.S. Appl. No. 12/258,045 35 pages.
Final Office Action dated Apr. 11, 2011 regarding U.S. Appl. No. 12/258,025 15 pages.
Non-Final Office Action dated Oct. 28, 2011 regarding U.S. Appl. No. 12/258,025 30 pages.
Notice of Allowance dated Apr. 27, 2012 regarding U.S. Appl. No. 12/258,025 20 pages.
PCT International Search Report and Written Opinion of The International Searching Authority, or the Declaration, 11 pages, dated Apr. 15, 2010, regarding International Application No. PCT/US2009/060847, International Filing Date Oct. 15, 2009, 11 pages.
Thekkath et al., "Frangipani: A Scalable Distributed File System", http://pages.wisc.edu/~remzi/Classes/838/Fall2001/Papers/frangipani-sosp97.pdt7, 14 pages.
Ellard et al., "DISP: Practical, Efficient, Secure and Fault-Tolerant Distributed Data Storage", http://www.eecs.harvard.edu/~ellard/pubs/ellard2004-disp.pdf, 24 pages.
Watson, "High Performance Storage System Scalability: Architecture, Implementation and Experience", http://storageconference.org/2005/papers/13_watsonr_highperformance.pdf, 15 pages.
Rodrigo et al, "Rosebud: A Scalable Byzantine-Fault-Tolerant Storage Architecture" (2004), http://citeseerx.ist.psu.edu/ viewdoc /sumrnary?doi=10.1.1.88.4, 14 pages.
Ghemawat et al., "The Google File System" IN: SOSP '03, Oct. 19-22, 2003, Bolton Landing, New York, Proceedings of the Nineteenth ACM Symposium on Operating Systems Principles (2003). Available at: ACM 1-58113-757-5/03/0010, pp. 29-43.
"Office Action Issued in European Patent Application No. 09822822.4", dated Feb. 7, 2018, 4 Pages.

* cited by examiner

PARTITION MANAGEMENT IN A PARTITIONED, SCALABLE, AND AVAILABLE STRUCTURED STORAGE

BACKGROUND

Distributed systems, including server farms, web services, and the like, have become increasingly common to provide vast amounts of computational and storage resources. For example, distributed storage systems have been utilized to store and retrieve vast amounts of data for various applications. In some cases, storage systems utilize structured storage to more efficiently store, retrieve, and query over data. A structured storage system may store data across multiple nodes throughout a network. As the amount of computing resources desired to provide such storage increases, such storage systems may be "scaled out" by adding additional computing devices thereby providing a flexible topology in which additional resources may be added as-needed. Accordingly, structured storage systems may be scalable, for instance, from petabytes to exabytes of stored data. As a result, it is often complex to manage data within such structured storage systems such that data is always available for access and durable to prevent data loss.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to partition management in a structured data storage system. In the store, structured data is divided into a number of partitions, which can be served by different servers. A partition map is used to keep track of the whereabouts of these partitions. More specifically, using the partition map, a client can find out which server is serving a specific piece of data. Detailed load information is tracked for partitions. Partitions can be moved among servers to achieve load balance across servers. In some embodiments, to achieve better load balance, a partition with high load is identified for splitting. A location for splitting the partition is determined, and the partition is split to create child partitions, which may be offloaded to another server in some embodiments. A partition map is updated to reflect that the partition has been split to the child partitions. In some embodiments, two or more partitions are identified for merging. The partitions are merged and a partition map is updated to reflect the merged partition.

The structured storage is built on top of a stream system, which presents an append-only file system interface. A stream is analogous to an append-only file. Each partition has a set of streams associated with it. All the persistent state of the partition is kept in the set of streams it associates with. Among the set of streams, there is a metadata stream for the partition, which contains the pointers to all the other streams of the partition as well as the essential information of that partition, such as the partition key range of all the rows included in the partition.

BRIEF DESCRIPTION OF THE DRAWINGS

The present invention is described in detail below with reference to the attached drawing figures, wherein.

DETAILED DESCRIPTION

Figure 1:
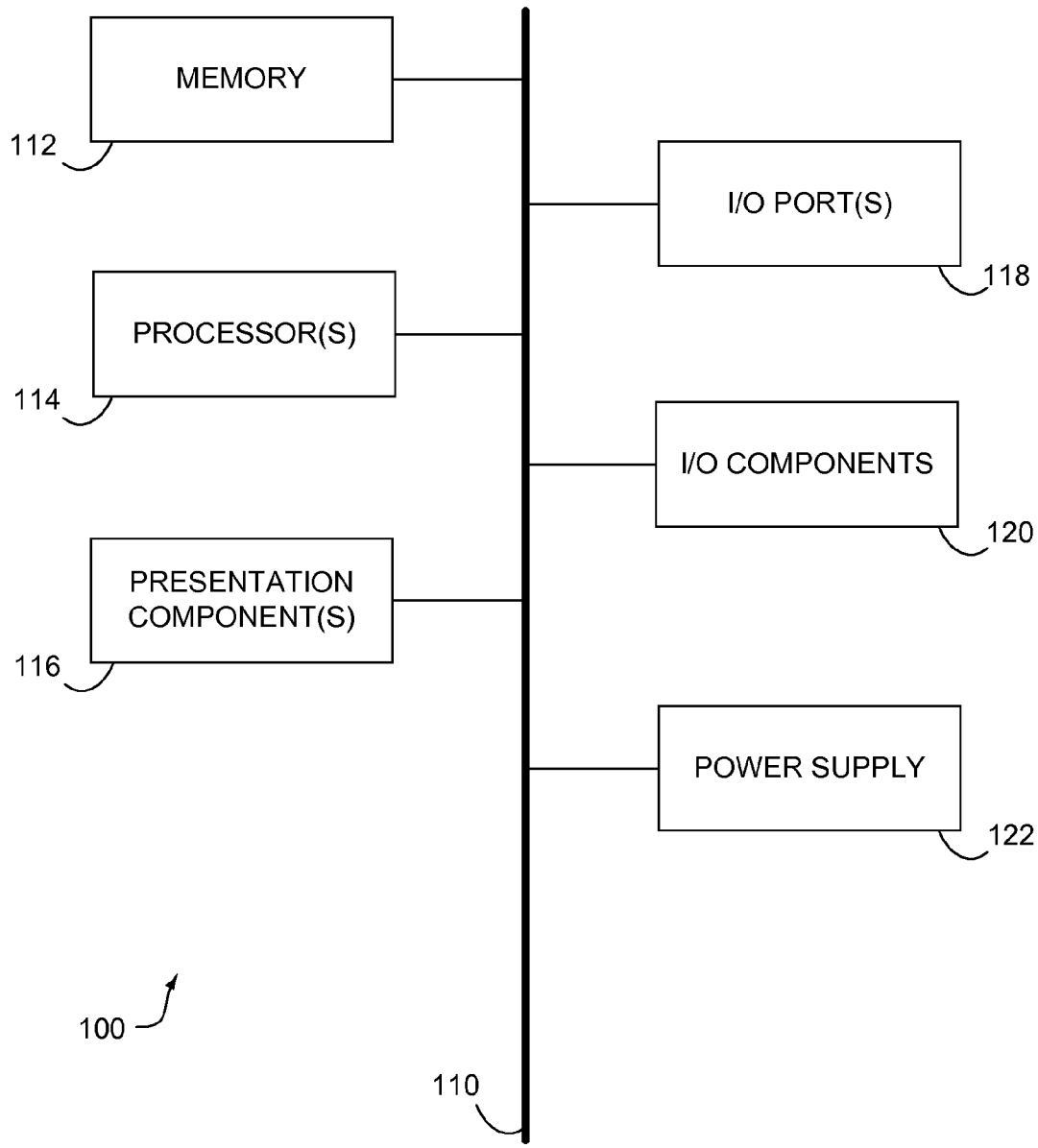
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide a scalable, available, and durable structured storage. The structured storage is represented by a number of tables, each of which includes multiple rows, each row representing a data entity. A table is divided into a number of partitions, each partition including a range of rows from the table. The partitions are stored on table servers and managed using a table master.

In some embodiments, partitions are split for load distribution purposes. Load distribution information is tracked for the table servers and partitions. Based on the load distribution information, the table master may decide to load balance partitions and reassign partitions to different nodes in order to distribute the load. In addition, for some partitions, the table master may decide to split a partition to distribute the current load. The table master determines a split ratio and queries the table server serving the partition for key information for locating the split. Based on the key information received from the table server, the table master instructs the table server to split the partition. Upon receipt of the split request, the table server unloads the target partition, creates the child partitions, and begins serving the child partitions. In some embodiments, a child partition may be assigned to another table server. A partition map is updated to reflect the table server(s) serving the child partitions.

In some embodiments, partitions are merged. Again, load distribution information is tracked for the table servers and partitions. Based on the load distribution information, two or more partitions are identified for merging. The table server(s) serving the partitions are instructed to stop serving the partitions. The partitions are merged and loaded to a table server, which begins serving the merged partition. A partition map is updated to reflect the table server serving the merged partition.

Accordingly, in one aspect, an embodiment of the present invention is directed to a method implemented by one or more computing devices within a structured storage system in which structured storage is represented by one or more tables, each table including a plurality of rows, each row representing a data entity stored by the structured storage system and including one or more keys for identifying the row, the plurality of rows being divided among a plurality of partitions, each partition including a range of rows from the plurality of rows within the table, wherein the plurality of partitions are stored on a plurality of table servers, and wherein a table master controls partition assignment to the plurality of table servers. The method is for splitting a partition into child partitions and includes identifying the partition for splitting based on load information for the partition, wherein the load information includes information specifying load on each of two or more portions of the partition. The method also includes determining, by the table master, a split ratio for splitting the partition based on the loading on each of the two or more portions of the partition. The method further includes querying the table server for key information indicating an actual location within the partition corresponding with the split ratio. The method also includes receiving key information at the table master from the table server, the key information indicating the actual location within the partition corresponding with the split ratio. The method further includes sending a split request from the table master to the table server, the split request indicating to split the partition based on the key information. The method also includes splitting the partition at a location corresponding with the key information to create the child partitions. The method further includes notifying the table master of split completion. The method still further includes updating a partition map based on the partition being split into the child partitions, the partition map storing mappings between the plurality of partitions and the plurality of table servers serving the plurality of partitions.

In another embodiment of the invention, an aspect is directed to one or more computer-storage media storing computer-usable instructions for performing a method for managing a structured storage system represented by one or more tables, each table including a plurality of rows, each row representing a data entity stored by the structured storage system and including one or more keys for identifying the row, the plurality of rows being divided among a plurality of partitions, each partition including a range of rows from the plurality of rows within the table, wherein the plurality of partitions are stored on a plurality of table servers, and wherein a table master controls partition assignment to the plurality of table servers. The method is for merging at least two partitions of the table into a merged partition and includes tracking load information for the plurality of partitions on the plurality of table servers. The method also includes identifying, by the table master, the at least two partitions to merge based on the load information. The method further includes creating, by the table master, a metadata stream for the merged partition. The method also includes offloading the at least two partitions from at least one table server serving the at least two partitions. The method further includes assigning, by the table master, the merged partition to a selected table server from the plurality of table servers. The method still further includes loading and serving the merged partition at the selected table server.

A further embodiment of the present invention is directed to one or more computer-storage media storing computer-usable instructions for performing a method for managing a structured storage system represented by one or more tables, each table including a plurality of rows, each row representing a data entity stored by the structured storage system and including one or more keys for identifying the row, the plurality of rows being divided among a plurality of partitions, each partition including a range of rows from the plurality of rows within the table, wherein the plurality of partitions are stored on a plurality of table servers, and wherein a table master controls partition assignment to the plurality of table servers. The method is for splitting a partition of the table into at least two child partitions and includes tracking load information for the plurality of partitions on the plurality of table servers. The method also includes identifying, by the table master, the partition to split based on the load information, wherein the load information for the partition identifies different loads on different portions of the partition. The method further includes determining, at the table master, a split ratio to split the partition, wherein the split ratio is specified based on loading information and represents a point in the partition in which a first portion of the partition includes a first amount of load and a second portion of the partition includes a second amount of load. The method still further includes sending a request from the table master to the table server, the request for key information identifying an actual location in the partition corresponding with the split ratio. The method also includes determining, by the table server, the key information identifying the actual location in the partition corresponding with the split ratio and communicating the key information from the table server to the table master. The method further includes constructing, at the table master, a metadata stream for each of the child partitions. The method still further includes sending a split request from the table master to the table server; and building, at the table server, the child partitions from the partition. The method also includes ceasing to serve the partition at the table server; and loading and serving the child partitions at the table server. The method further includes sending a split completion notification from the table server to the table master. The method still further includes updating a partition map based on the partition being split into the child partitions, the partition map storing mappings between the plurality of partitions and the plurality of table servers serving the plurality of partitions.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, networking device, etc.

High Level Data Model

Figure 2:
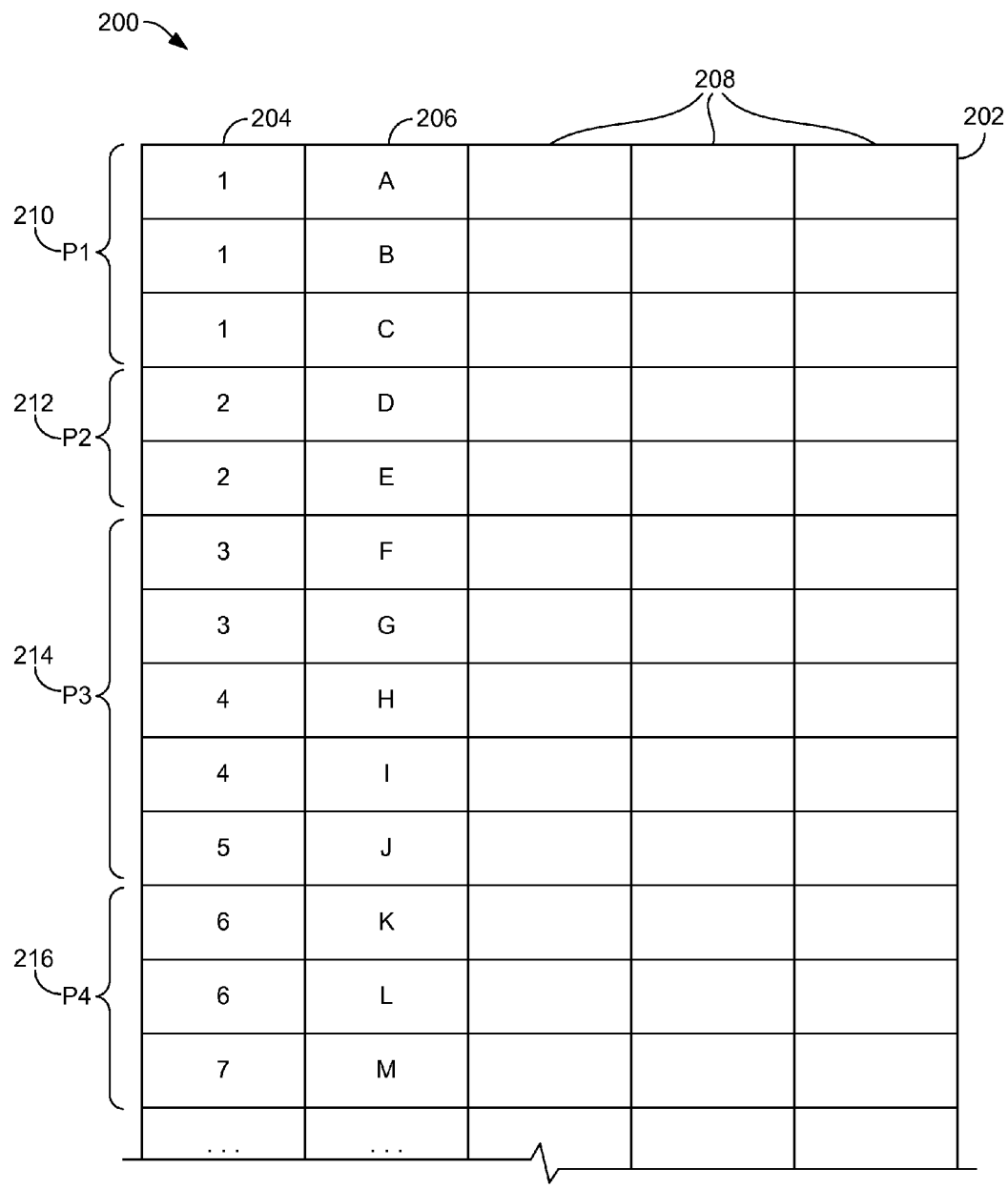
FIG. 2 depicts a table structure in accordance with an embodiment of the present invention.

In accordance with embodiments of the present invention, structured storage is represented by tables, where a table contains a set of rows. By way of illustration, FIG. 2 depicts a portion of a table 200 in accordance with an embodiment of the present invention. Each row in the table 200, such as the row 202, represents a data entity and contains a set of properties, which are identified in a series of columns, including the properties 204, 206, and 208 (the data values of columns 208 are left empty for simplification and clarity purposes). A property/column can be, for instance, a name, typed value pair, or a name to multiple typed value mapping. The row and/or each individual property may or may not be versioned. The table itself can have a fixed schema where every row in the table has the same properties with the same types, or can have no schema enforced where every row can have a different set of properties and types stored.

The standard set of operations performed on a structured store includes the ability to insert, update and delete tables, rows and properties. In addition, functionality is provided to scan and query over tables, rows and properties to find a set of tables, rows, or properties that match the specified scan/query.

Partitioning

Tables can grow to billions or trillions of rows and terabytes/petabytes of data, and a table may need to be spread across thousands of servers to handle the traffic/load to the different parts of a table. To achieve this scalability for structured storage, embodiments employ partitioning to spread the tables and rows out over the servers. Partitioning groups/breaks the rows in a table into partitions, and then the partitions can be assigned to and served (provide read and write access to) from different servers.

To make the table scalable, the table has one to many keys that are called the properties that make up the partition keys. For instance, with reference to the table 200 of FIG. 2, the first column 204 of the table 200 includes a partition key for each row/entity. If there is more than one partition key property/column for a given table, then the properties/columns combined together form a composite partition key for that table. The value of the partition key for a row is used to identify the partition to which the entity/row belongs. The rows with the same partition key value are said to be grouped into the same partition.

In addition to partition keys, each row may have zero to many additional row key properties/columns. For instance, referring again to the table 200 of FIG. 2, the second column 206 of the table 200 includes a row key for each row/entity.

The row key represents the unique ID of the row within the partition. The partition key combined with the row key represents the primary key (unique ID) for the row/entity in the table. The primary key represents the primary sort order for the partitions in the table. If there are no row keys, then the partition key is the primary key and has to uniquely identify each entity in the table. Although the description below discusses embodiments of the invention in terms of a single partition key and single row key, the same is applicable when multiple partition and/or row keys are used.

The partition key is used to group together rows that have the same partition key "value," whereas the row key represents the unique ID of the row within the partition. The breaking up of table rows based on the partition key value is referred to herein as partitioning the table. This groups/breaks the table's rows into partitions. A partition is the set of rows with the same partition key value, so all of the rows with the same partition key will always be stored into the same partition. Therefore, two rows with the same partition key value are in the same partition, and are not split across two partitions. Additionally, in some embodiments, the definition of partition is extended to allow multiple rows with different partition key values to be grouped into the same partition as long as their key values appear contiguous in the partition key namespace. By way of example with reference to the table 200 of FIG. 2, four partitions are illustrated, including a first partition (P1 210), a second partition (P2 212), a third partition (P3 214), and a fourth partition (P4 216). As shown in FIG. 2, some partitions include rows of a single partition key value, while other partitions include rows of multiple partition key values. As examples of the former, P1 210 includes all rows having a partition key value of 1 and P2 212 includes all rows having a partition key value of 2. As examples of the latter, P3 214 includes all rows having a partition key value 3, 4, or 5, and P4 216 includes all rows having a partition key value of 6 or 7.

Advantages of partitioning include, but are not limited to: (1) the ability to scale access to the table by breaking it into partitions and spreading the partitions over the servers based upon the access patterns and traffic needs of the data, and (2) rows in the same partition are grouped together and accessed from the same table server, which allows for more efficient querying, scans, and caching when the operation is scoped within a partition. Scanning over a partition is much more efficient since, at most, only those rows within the partition need to be scanned, since it is accessed from a single table server for the partition, instead of potentially having to traverse over the whole table if not specifying the partition key when querying.

High Level Architecture

In accordance with embodiments of the present invention, a set of servers, referred to herein as "table servers," store and provide access to the structured storage system. Additionally, a set of servers, referred to herein as "table masters," manage the table servers. A "table client" provides applications access to the structured storage system.

Figure 3:
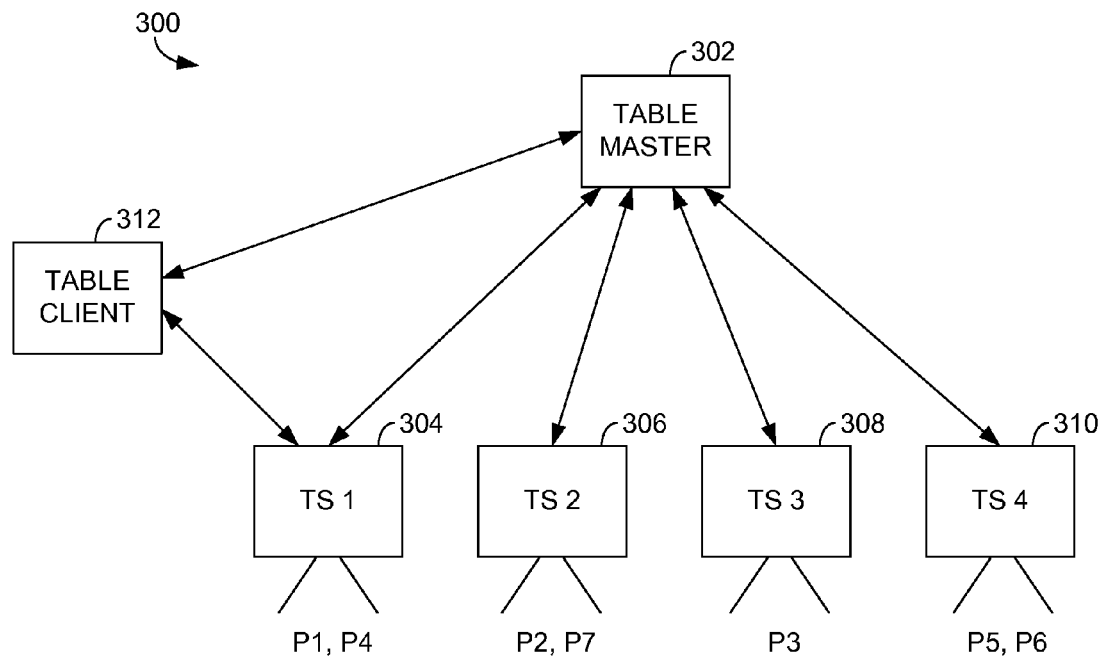
FIG. 3 is a block diagram showing an exemplary system in which embodiments of the present invention may be implemented.

Referring now to FIG. 3, a block diagram is provided illustrating a high level architecture of a system 300 in accordance with an embodiment of the present invention. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 300 generally includes a table master 302, table servers 304, 306, 308, 310, and a table client 312. Each may reside on any type of computing device, such as computing device 100 described with reference to FIG. 1, for example. The components of the system 300 may communicate with each other via a network, which may include, without limitation, one or more local area networks (LANs) and/or wide area networks (WANs). It should be understood that although only a single table master, four table servers, and a single table client are shown in FIG. 3, any number of table masters, table servers, and table clients may be employed within the system 300 within the scope of embodiments of the present invention.

The table master 302 is responsible for: (1) assigning partitions to table servers 304, 306, 308, 310; (2) quickly determining when a partition is not served due to a failure and reassigning the partition to a different table server; (3) controlling the load balancing of partitions among table servers 304, 306, 308, 310, and (4) monitoring the health of the table servers 304, 306, 308, 310.

Each of the table servers 304, 306, 308, 310 is responsible for providing read and write access to the partitions assigned to it by the table master. Each of the table servers 304, 306, 308, 310 can host zero to many partitions. In the example of FIG. 3, TS1 304 hosts partitions P1 and P4, TS2 306 hosts partitions P2 and P7, TS3 308 hosts partition P3, and TS4 310 hosts partitions P5 and P6

The table client 312 is linked into an application and is used to issue commands to the partitions maintained by the table servers 304, 306, 308, 310. The table client 312 uses a partition map to determine the table server serving the partition, and it sends commands to that table server. The table client 312 also receives the results back from the table server and passes them to the application. The partition map is a special table, which stores the mapping between the partitions and the table servers serving them, and is maintained by the table master 302.

Figure 4:
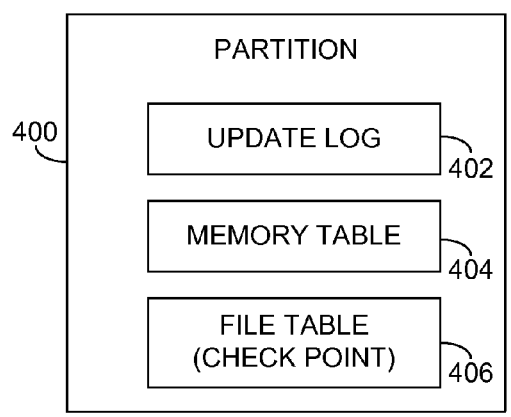
FIG. 4 is a block diagram showing a partition in accordance with an embodiment of the present invention.

As represented in FIG. 4, internally, a partition 400 served at a table server includes three main parts: an update log 402, one to many memory tables 404, and zero to many file tables 406. The update log 402 keeps track of the recent changes to the partition in persistent storage. The memory table 404 is the in-memory version of the recent (delta) updates in the update log. These are the recent delta changes to the partition 400. When the memory table 404 gets big enough or has enough changes in it, the memory table 404 is checkpointed to a file table 406, which is persisted to storage. When this occurs, all of the requests in the update log 402 up to the checkpointed memory table 404 can be removed from the update log 402. As described earlier, a partition has a set of streams to store its persistent state. The update log 402 is stored in one of these streams, which is called an update log stream. All the file tables 406 are stored in one of these streams, which is called a file table stream.

When a table server loads a partition, the table server replays all the requests in the update log since the most recent checkpoint, in order to reconstruct the memory table back to the state right before the partition was last offloaded.

When accessing a partition at a table server, the table server first looks to see if there is a matched row in the memory table in order to see all the recent changes, and if there is no match, it looks in its page cache and file table for the data.

There can be multiple memory tables for a partition and multiple file tables. There can be multiple memory tables because when one memory table becomes full, it needs to be checkpointed to a file table. When this occurs, the current memory table is set to be read only while it is checkpointed, and a new memory table is created for the partition for writing. Therefore, a partition always has one memory table being used for recent (delta) updates, and it can have one or more memory tables being lazily checkpointed. Once a memory table is checkpointed to a file table, it can be deleted or garbage collected.

Due to all of the checkpointing done for a partition, there can be multiple file table checkpoints for the partition. This means that when data needs to be read from the file tables, potentially multiple files tables need to be looked at and they are looked up from the most recent to the oldest. This is because the most recent file table written contains the most recent changes for the partition. When enough file tables have been checkpointed for a partition, the table server lazily compacts/merges the file tables together into a new merged file table in order to reduce the number of file tables that have to be searched through in order to find the data being looked up for a partition.

Scalable, Available and Durable Structured Storage

Embodiments of the present invention employ partitioning, load balancing, and throttling to provide a scalable structured storage system. Scalability is provided by: (1) splitting tables into partitions and spreading the partitions over many servers in the data center; (2) using load balancing to move partitions from a heavily loaded table server to a lighter loaded table server; and (3) throttling to drop requests to a partition that has too much traffic being sent to it or dropping requests to a table server that has too much traffic being sent to it.

Scalability is provided by automatically splitting tables into partitions based on the load to the different parts of the partitions, and then load balancing across the table servers. Load balancing lets the system dynamically adapt to the workload, spreading the load across a large number of machines, thereby achieving better scalability by efficiently utilizing all the physical resources. In addition, throttling protects the system from high load, keeping the system operating in an efficient/optimized regime.

Availability is provided by the table master by identifying partitions not being served, assigning them to different table servers and updating the partition map, which allows the table client to find the new location of the partition to access it. Quick reassignment of partitions in the event of node/network failures keeps all partitions accessible and yields high system availability.

Durability is provided by storing all of the partition data into a replicated stream layer. The stream layer provides a file system like interface to write and read data from a stream (similar to a file), and the stream layer provides full functionality to make sure that the data is replicated, always durable and available from any of the table servers in the system. Therefore, partition information, including the partition map, update logs and file tables are stored into the stream layer.

Efficient Stream Level Operations

The stream layer provides the capability of efficiently hard-linking a region of the stream into another stream. Each stream at the stream layer is composed of a list of data blocks, called extents. The data in the stream is in fact stored inside those extents. A stream is an ordered list of extents. A given extent can reside in multiple streams, or even appear multiple times in the ordered extent list of the same stream. The stream layer provides an interface to compose a stream by linking a set of existing extents, which reside in another stream. No real data copy is involved in this process, so it is very efficient. The stream layer maintains the reference count of each extent. Once an extent has no streams pointing to it, the stream layer will garbage collect/delete this extent from the system.

The stream layer also supports the ability to have multiple stream level operations, such as creation, deletion, renaming of streams, and hard-linking extents to a stream, in one atomic transaction.

The structure storage system makes extensive use of these features to efficiently garbage collect the obsolete portion of the streams of a partition. An example is that once a checkpoint of a partition is made, all the messages in the update log before the checkpoint are no longer used. These features are used to efficiently truncate the update log by atomically creating a new stream of the same name as the update log stream, hard-linking the extents which are still in use from the original stream to the new stream, and deleting the original stream. All these are done in one atomic transaction. This significantly simplifies failure handling logic. Similar schemes are also used for other streams, such as file table stream and metadata stream, of a partition.

The structured storage system also makes extensive use of these features to efficiently implement split and merge of partitions, as described in latter sections. More specifically, these features are used to efficiently reference data from the original partition(s) to the child partition(s) created from split/merge, without having to physically copy or move any bits.

Splitting, Merging, and Load Balancing Partitions

Some embodiments of the present invention balance load distribution among the table servers within the storage system. Generally, table servers keep track of the load of each partition, and periodically report this information to the table master. The table master makes load balance decisions by moving partitions among table servers. This is achieved by offloading the target partitions from the original table server, and assigning the partitions to other table servers.

As an optimization, some embodiments of the invention may have the table master send a "prepare to offload" request to a table server before or when the partition is offloaded. Upon receiving this request, the table server will do a checkpoint on the partition in order to reduce the amount of logs that need to be replayed when the partition is loaded again. This is provided to meet the availability SLAs for serving the partition.

In the cases where a single partition has a relatively higher load, it may become desirable to split the partition into two or more partitions, and this is only possible if the partition contains more than one partition key value. Subsequently, one or more of the child partitions may be offloaded to a different table server to achieve load balance.

For load distribution tracking, a sampling mechanism is used by each table server to keep track of fine-grained load information within each partition without consuming much memory. To track load information, a partition is divided into multiple partition key ranges, referred to herein as "buckets," and the load corresponding with each bucket is tracked. More specifically, the table server probabilistically samples the requests that fall into these buckets, and keeps track of the load distribution across buckets. For instance, referring to the partition P3 214 within the table 200 of FIG. 2, the partition may be divided into two buckets for load tracking purposes. The first bucket would include rows with the partition key value of 3, and the second bucket would include the rows with the partition key value of 4 and the partition key value of 5. In embodiments, the bucket boundary must always be on a partition key value. Namely, rows with the same partition key value will always be in the same bucket. For instance, the rows with the partition key value of 3 cannot be split into two buckets for load tracking purposes as well as splitting purposes.

In some embodiments, based on the traffic samples collected, the bucket boundaries may be dynamically adjusted in order to more accurately track the traffic distribution across the keys within a partition. Namely, if two existing buckets do not have much load compared to other buckets, they will be merged into a single bucket; conversely, if one bucket contains significantly more load than all the other buckets, that bucket can be split into two if possible. For instance, in the previous example, if the second bucket contains too much load compared to the first bucket, it can be split into two smaller buckets, one of which contains rows with partition key value 4, and the other of which contains rows with partition key value 5. Furthermore, if the first bucket containing partition key value 3 has little load, then it can be merged with the bucket containing partition key value 4. This monitoring and adjusting of bucket sizes is all done dynamically on the fly. Besides the bucket level sampling scheme used to track the load distribution across partition keys within one partition, the table server also keeps track of the total amount of work load on the entire partition. The latter is communicated to the table master. Therefore, when a partition needs to be split based on load, fairly accurate load distribution information is available to both the table server and the table master for determining where the partition should be split.

Figure 5:
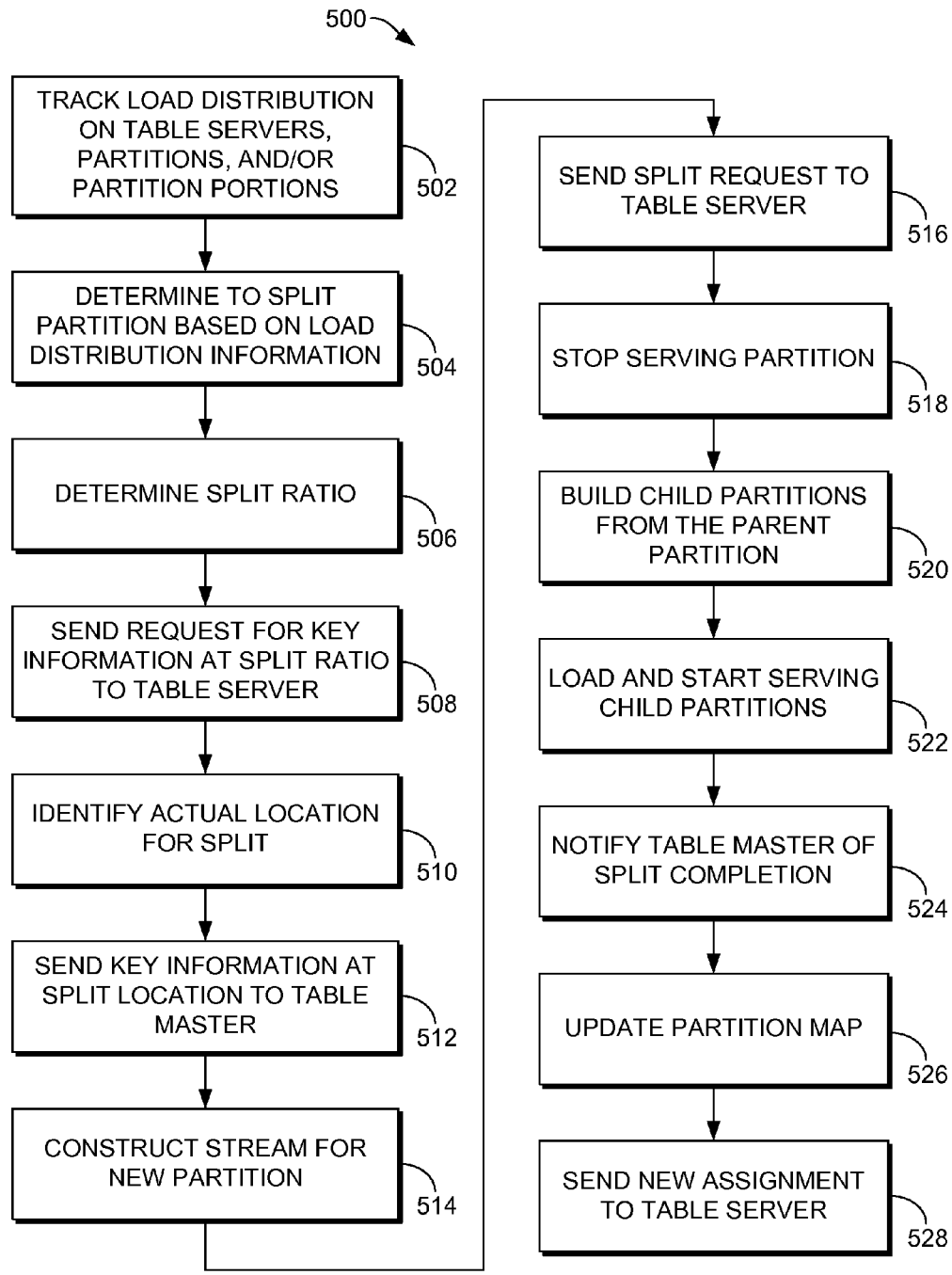
FIG. 5 is a flow diagram showing a method for splitting a partition in accordance with an embodiment of the present invention.

Referring now to FIG. 5, a flow diagram is provided illustrating a method 500 for splitting a partition in accordance with an embodiment of the present invention. In the embodiment of FIG. 5, a parent partition, P1, is split into two child partitions, P1' (the original partition modified to include only a subset of rows) and P2 (a new partition that includes the remaining rows). Although FIG. 5 discusses splitting a partition to two child partitions, it should be understood that a partition may be split into more than two child partitions in accordance with embodiments of the present invention.

Initially, as shown at block 502, load distribution information is tracked for table servers, partitions, and/or partition portions (i.e., "buckets"). By tracking fine-grained load information at the partition portion level as described above, determinations may be made regarding where to split a partition. Load information is tracked by the table servers and periodically provided to the table master. In the current embodiment, the load information sent to the table master includes the total load of each partition and the load of each table server. Some other embodiments may provide all the load tracking information, including the bucket level information, to the table master. Additional information, restrictions, and hints are provided from the table server to the table master for a partition to aid in load balancing and splitting decisions. For example, based on the distribution of the bucket information, the table server may label a partition is "reluctant to split" with a degree of severity, where high means that the table master should not request a split for the partition since the table server won't split the partition, where medium means that there are certain situations where the table server may choose not to split the partition and the table master can override that decision, and where low means the table server will listen and take direction from the table master.

The table master uses the load information to make load distribution decisions, including whether to split partitions, whether to merge partitions, and/or whether to move partitions among the table servers. In the present embodiment of FIG. 5, the table master determines to split a partition (P1) based on the load distribution information, as shown at block 504.

The table master determines a split ratio for splitting the partition at block 506. The split ratio represents a load ratio for determining a location at which the partition should be split. For example, the table master may decide to split a partition at a 30%/70% load point. In other words, the partition should be split at a point where the load to a first portion of the partition is 30% and the load to the remainder of the partition is 70%. At block 508, the table master sends a request to the table server hosting the partition identified for splitting. In particular, the table master requests key information specifying the location corresponding with the split ratio in the partition. In response to the request, the table server identifies the actual partition key location for splitting the partition based on the split ratio, as shown at block 510. The actual location attempts to match the load distribution specified by the split ratio, although the actual load distribution may vary. For instance, the split ratio requested by the table master may be a 30%/70% load distribution, but the closest match that may be provided may be a 35%/65% load distribution.

In some embodiments, the actual location for the split is identified using partition key information. For instance, if the partition P3 214 of FIG. 2 were to be split between the partition key value of 3 and 4, the key information identifying the split may be the partition key value of 3 and/or the partition key value of 4. Any and all such variations are contemplated to be within the scope of embodiments of the present invention. The table server returns the key information for the split ratio to the table master, as shown at block 512.

The table master constructs a stream for a new partition (P2) as one of the child partitions, as shown at block 514. All the persistent state of a partition is kept in "streams" for that partition. There is a metadata stream for the partition, which contains the pointers to all the other streams of the partition as well as the essential information of that partition, such as the partition key range of all the rows included in the partition. In this step, the table master is responsible for creating the metadata stream for the new partition (P2) with the correct partition key range information, which corresponds to the split ratio. Additionally, the table master sends a split request to the table server at block 516. The split request may be provided in the next heartbeat from the table master to the table server.

In some embodiments, appropriate master logs are written to handle failures. The table master logs each step after the corresponding step is completed, so that in case of master failure, the logs can be replayed, and the table master can resume the split from where it left off.

After receiving the split request, the table server stops serving and unloads the original partition (P1), as shown at block 518. The table server also builds the two child partitions (P1' and P2) from the original partition, as shown at block 520. The table server constructs the streams for the new partition (P2) (besides the metadata stream) based on the information in the original partition (P1). More specifically, the portion of the data that belongs to the key range of P2 will be efficiently copied/hard-linked from partition P1 into the streams of partition P2 using a feature of the underlying stream layer. The child partition P1' is "created" by adjusting the key range of P1. The child partition P1' uses the same set of streams as the original partition P1. The metadata of P1' is changed to adjust to the reduced key range.

As shown at block 522, the table server loads both of the child partitions (P1' and P2) and begins serving those partitions. Additionally, the table server notifies the table master about the completion of the split, as shown at block 524. This notification may be provided in the next heartbeat from the table server to the table master. In response to the split complete notification from the table server, the table master updates the partition map to reflect the new partitions, as shown at block 526. At this point, the table master may consider the split complete. The table master sends a new assignment that includes the newly created child partition (P2) to the table server so that it matches the partition map, as shown at block 528.

In some embodiments, after a partition has been split, the table master may determine to move a child partition from the table server on which the original partition resided to another table server. This allows the table master to effectively distribute load across the network. Partition movement is achieved by offloading the partition from one table server and then assigning it to another table server.

In other embodiments of the present invention, the performance of the split protocol described above with reference to FIG. 5 can be improved by creating the new child partition before the original partition is unloaded at block 518. Other variations to the method 500 described above may also become apparent to those skilled in the art and are within the scope of embodiments of the present invention.

Figure 6:
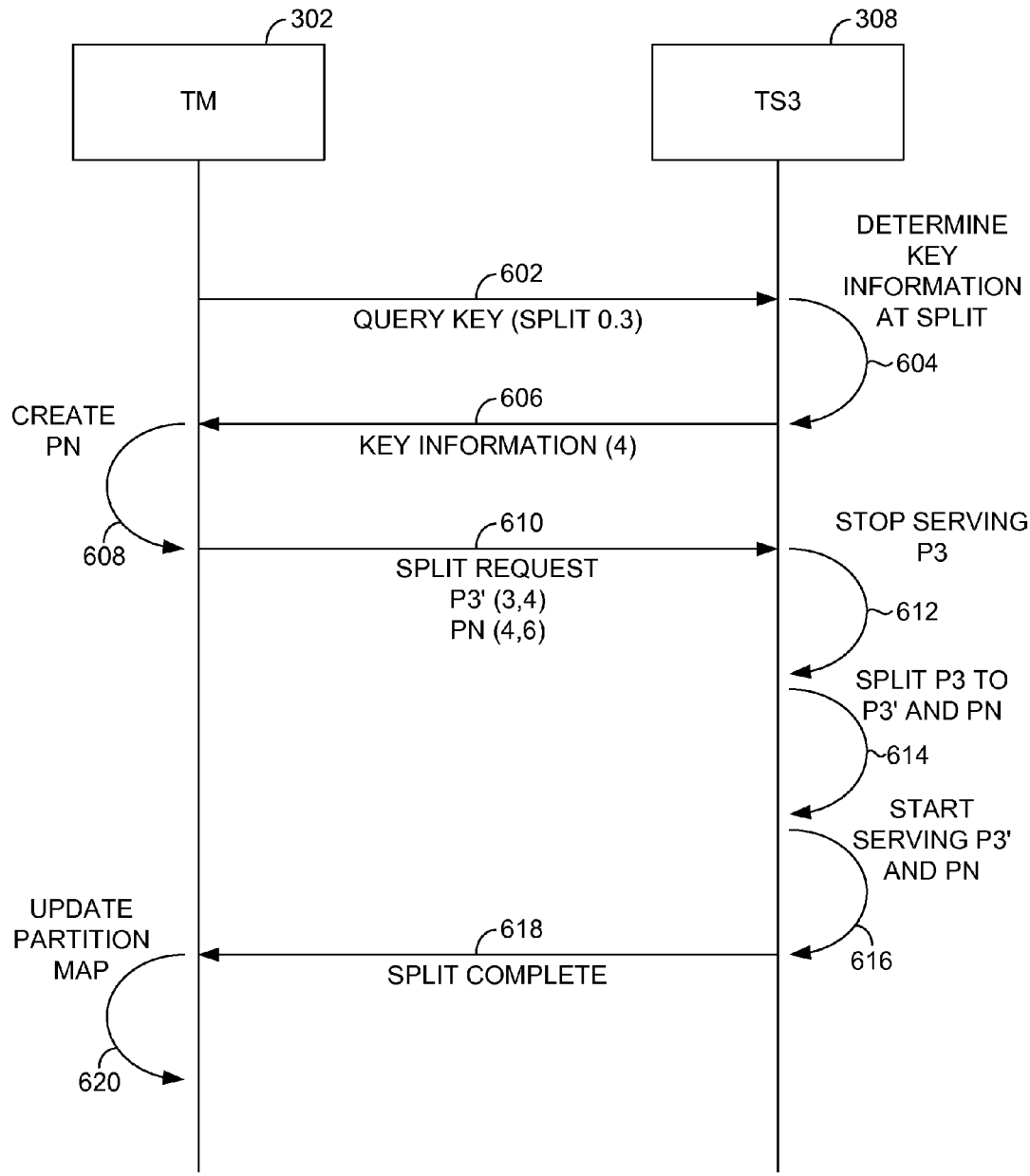
FIG. 6 depicts an example of a parent partition being split into two child partitions in accordance with an embodiment of the present invention.

FIG. 6 illustrates an example of splitting P3 214 of FIG. 2 in accordance with an embodiment of the present invention. In particular, FIG. 6 illustrates the interaction between the table master 302 and TS3 308 of FIG. 3 to perform a split of P3 214, which resides on TS3 308. Initially, as shown at 602, the table master 302 sends a request to TS3 308 to query key information to identify a location to split P3 214. The request specifies a 0.3 split ratio, indicating that the table master wishes to split P3 214 at a location between one portion of P3 214 that has received 30% of the load on P3 214 and the remaining portion that has received 70% of the load.

In response to the request from the table master 302, TS3 308 determines key information corresponding with the split ratio specified by the table master 302. The key information represents the location between two portions of P3 214 based on the 30%/70% load distribution specified by the table master 302 as the split ratio. In the present example, TS3 308 determines that the load on rows with the partition key value of 3 has approximately 30% of the load while the load on the remaining rows has approximately 70% of the load. As such, the key information determined by TS3 308 in the present example is the partition key value of 4. It should be understood that in various embodiments, other key information could be provided to identify the location at which P3 214 should be split.

At 606, TS3 214 communicates the key information (i.e., the partition key value of 4) to the table master 302. The table master 302 constructs the stream for a new partition, PN, at 608. Additionally, the table master 302 sends a split request to the table master, as shown at 610. The split request in the present example specifies the range for each of the child partitions. In particular, for one child partition, P3', the split request indicates a low partition key value of 3 and a high partition key value of 4, indicating that P3' includes the rows having the partition key value of 3. For the other child partition, PN, the split request indicates a low partition key value of 4 and a high partition key value of 6, indicating that PN includes the rows having the partition key value of 4, as well as the rows having the partition key value of 5.

Based on the split request, TS3 stops serving the original partition, P3 214, at 612. Additionally, TS3 308 splits P3 to P3' and PN, as shown at 614, and begins serving P3' and PN, as shown at 616. TS3 308 then sends a split complete notification to the table master 302, as shown at 618. The table master 302 updates the partition map at 620 to reflect the child partitions.

Figure 7:
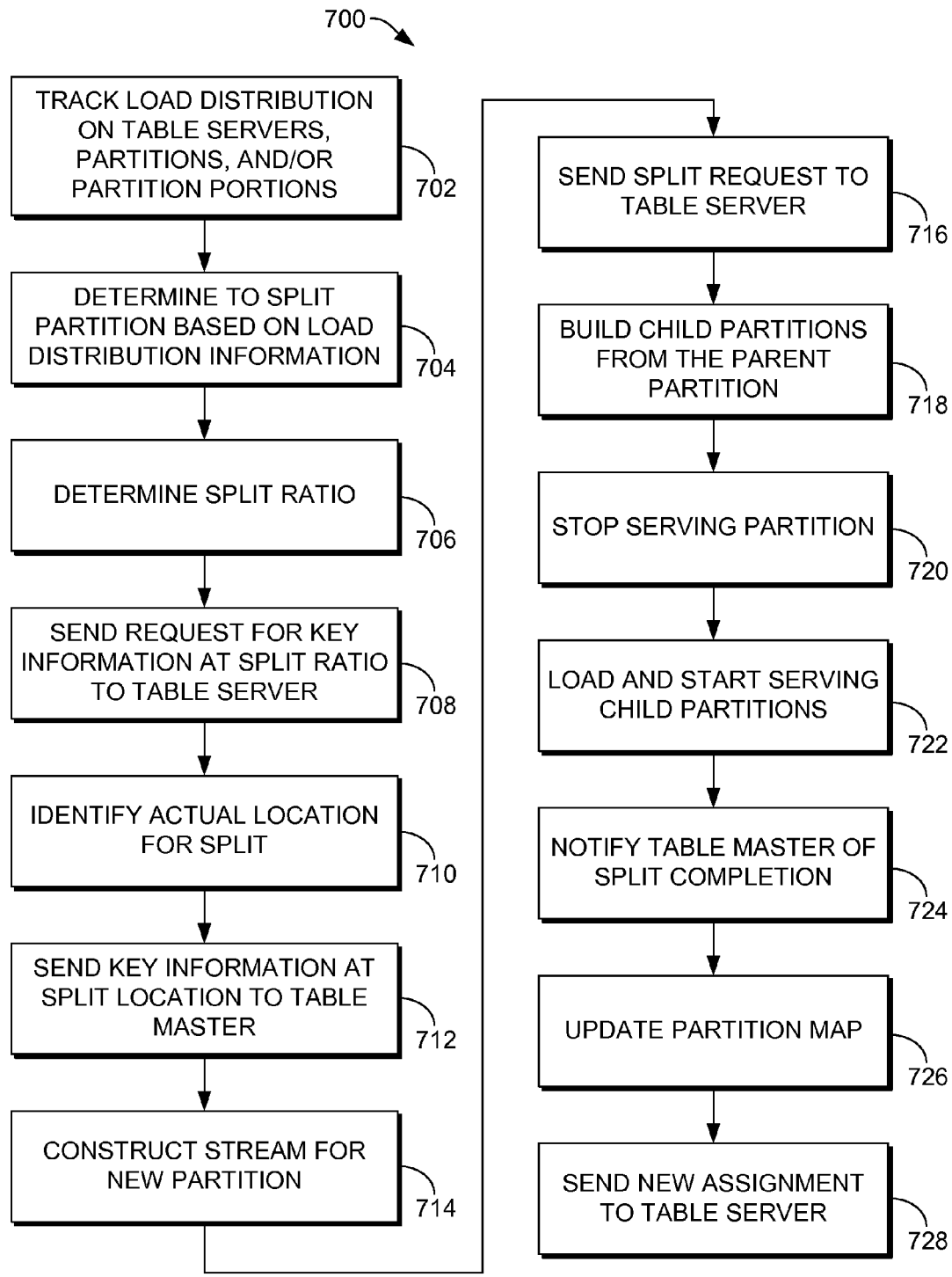
FIG. 7 is a flow diagram showing a method for splitting a partition in accordance with another embodiment of the present invention.

Turning now to FIG. 7, a flow diagram is provided illustrating a method 700 for splitting a partition in accordance with another embodiment of the present invention. In the embodiment of FIG. 7, a parent partition, P1, is split into two new child partitions, P2 and P3, which each include a portion of the rows from the parent partition, P1. Although FIG. 7 discusses splitting a partition to two child partitions, it should be understood that a partition may be split into more than two child partitions in accordance with embodiments of the present invention.

Similar to the method 500 of FIG. 5, load distribution information is initially tracked, as shown at block 702. The load distribution information allows the table master to make load distribution decisions, including whether to split partitions, whether to merge partitions, and/or whether to move partitions among the table servers. In the present embodiment of FIG. 7, the table master determines to split a partition (P1) based on the load distribution information, as shown at block 704.

The table master determines a split ratio for splitting the partition at block 706. As discussed previously, the split ratio represents a load ratio for determining a location at which the partition should be split. For example, the table master may decide to split a partition at a 30%/70% load point. At block 708, the table master sends a request to the table server hosting the partition identified for splitting. In particular, the table master requests key information specifying the location corresponding with the split ratio in the partition. In response to the request, the table server identifies an actual location for splitting the partition based on the split ratio, as shown at block 710. The table server returns key information for the split ratio to the table master, as shown at block 712.

The table master constructs the metadata streams for the new partitions (P2 and P3), as shown at block 714. In some embodiments, appropriate master logs are written to handle failures. The table master logs each step after the corresponding step is completed, so that in case of master failure, the logs can be replayed, and the table master can resume the split from where it left off. Additionally, the table master sends a split request to the table server at block 716. The split request may be provided in the next heartbeat from the table master to the table server.

In response to the split request, the table server builds the two child partitions (P2 and P3) from the original partition (P1), as shown at block 718. The table server constructs the streams for the new partitions (P2 and P3) (besides the metadata stream) based on the original partition (P1). More specifically, the portion of the data that belongs to the key range of P2 will be efficiently copied/hard-linked from partition P1 into the streams of partition P2 using a feature of the underlying stream layer. Similarly, the portion of the data that belongs to the key range of P3 will be efficiently copied/hard-linked from partition P1 into the streams of partition P3 using the same feature of the underlying stream layer.

The table server stops serving and unloads the original partition (P1), as shown at block 720. Additionally, as shown at block 722, the table server loads both of the child partitions (P2 and P3) and begins serving those partitions. The table server notifies the table master about the completion of the split, as shown at block 724. This notification may be provided in the next heartbeat from the table server to the table master. In response to the split complete notification from the table server, the table master updates the partition map to reflect the new partitions, as shown at block 726. At this point, the table master may consider the split complete. The table master sends a new assignment that includes the newly created child partitions (P2 and P3) to the table server so that it matches the partition map, as shown at block 728.

In some instances, a table master may determine to merge two or more partitions into a single partition based on, for instance, load distribution information. In an embodiment, a merge is performed when two adjacent partitions (i.e., adjacent in the sequence of rows in the table) have relatively low load. Merging the partitions to a single partition may be beneficial to reduce the number of partitions in the system.

Figure 8:
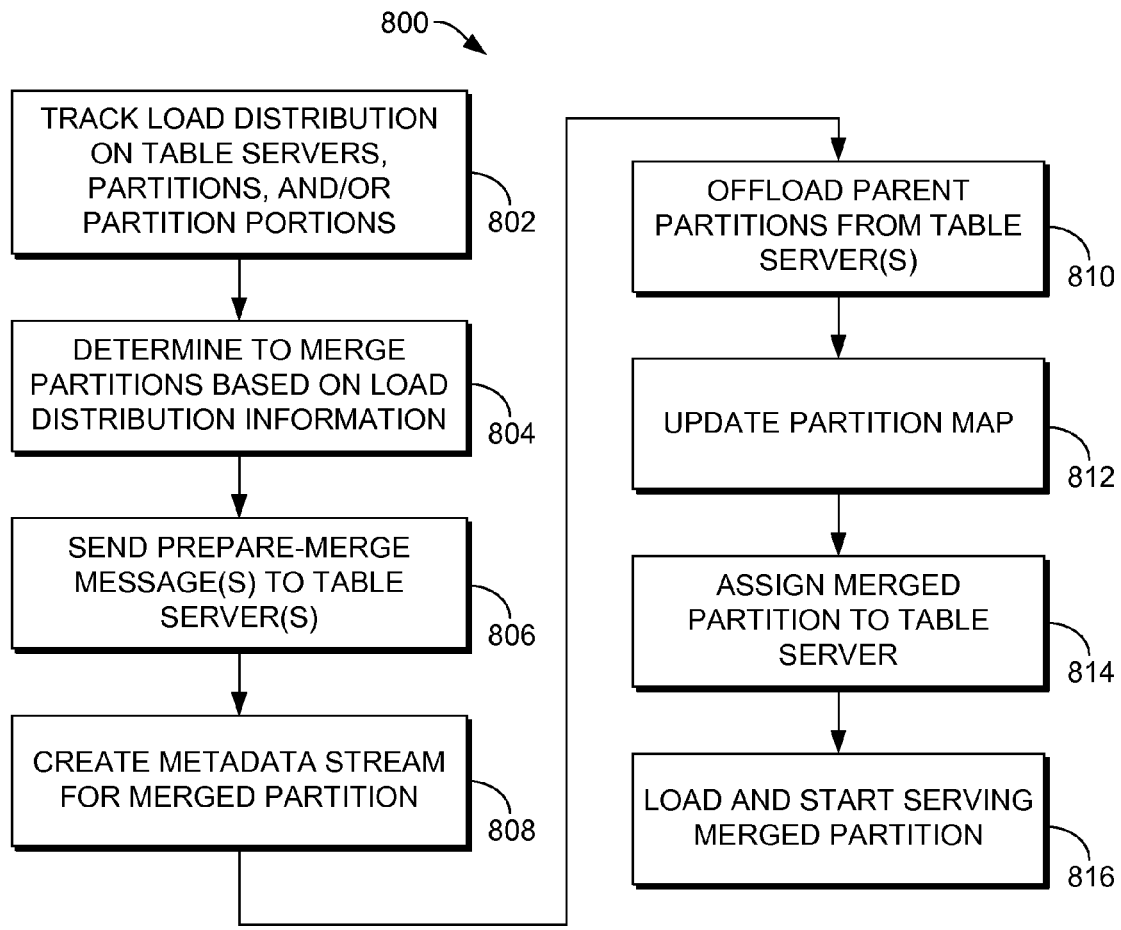
FIG. 8 is a flow diagram showing a method for merging partitions into a merged partition in accordance with an embodiment of the present invention.

Accordingly, FIG. 8 illustrates a flow diagram showing a method 800 for merging partitions in accordance with an embodiment of the present invention. As shown at block 802, load distribution information is initially tracked. Based on the load distribution information, the table master determines that two partitions (P1 and P2) should be merged into a new partition (P3), as shown at block 804. In embodiments, only partitions that form a continuous and non-disjoint partition key range can be merged.

When the table master decides to merge two partitions, the table masters sends 'prepare-merge' message(s) to the table server(s) serving the two partitions, as shown at block 806. In some instances, both partitions may reside on a single table server, while in other instances the partitions reside on different table servers. The 'prepare-merge' message gives the table server(s) an opportunity to compact the partitions prior to the merge in order to reduce the load time for the merged partition.

The table master creates the metadata stream for the merged partition (P3) at block 808 and offloads the two parent partitions (P1 and P2) from the table server(s) on which the parent partitions reside at block 810. The table master then updates the partition map (atomically removes the old partitions entries, and inserts the new partition entry), as shown at block 812. From the table master's perspective, the merge transaction is complete at this point, since in the case of a table master failover the new merged partition will be found in the persisted partition map during bootstrap.

The table master assigns the merged partition (P3) to a table server, as shown at block 814. The table server to which the merged partition is assigned may be any table server in the system. For instance, the assigned table server may be the table server on which one or both of the parent partitions resided or may be a different table server in the system.

Upon assignment, the table server loads the merged partition, as shown at block 816. From the metadata stream of the merged partition, the table server knows that this is a merged partition, and it constructs the merged partition's streams from the parent partitions by efficiently copying/hard-linking the data from the parent partitions using a feature from the underlying stream layer. After the construction is done, the table server records this event into the metadata stream of the merged partition (so that the next time this partition is loaded, the streams will not be constructed again), and deletes the parent partition's streams.

Recovering from Corrupt Partitioned State

A durable structured storage system should be able to recover from bugs in the system state. To achieve this ability, the structured storage system in an embodiment of the present invention is built on an append-only store, and all deleted data is retained for a minimum length of time that is deemed long enough to discover any corruption in the system.

Figures 9, 10:
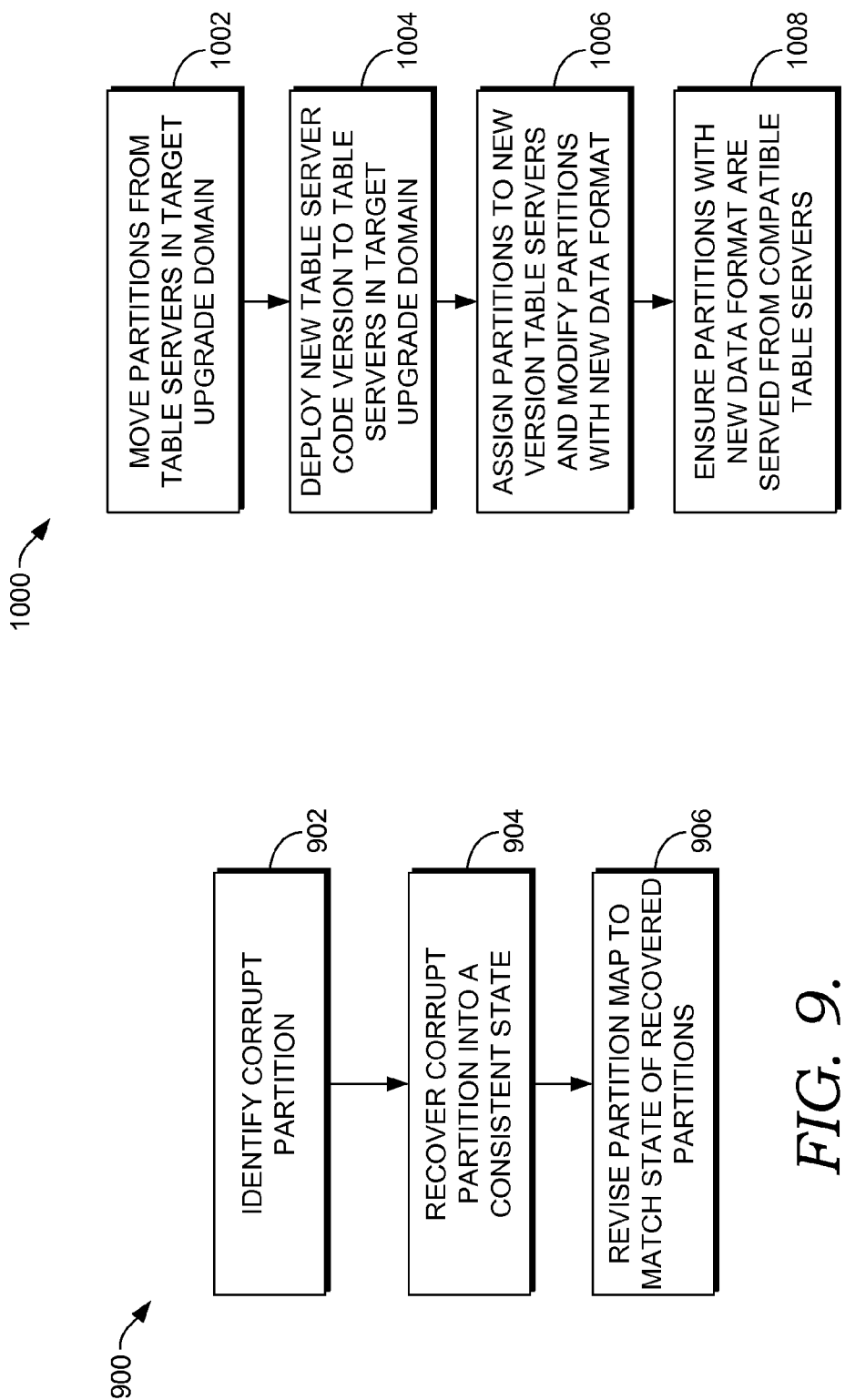
FIG. 9 is a flow diagram showing a method for recovering a corrupt partition in accordance with an embodiment of the present invention.
FIG. 10 is a flow diagram showing a method for partition versioning and upgrade in accordance with an embodiment of the present invention.

Referring now to FIG. 9, a flow diagram is provided illustrating a method 900 for recovering a partition from a corrupt partition state in accordance with an embodiment of the present invention. Initially, as shown at block 902, a corrupt partition is identified. If a partition becomes corrupt and cannot be served, an alert is raised marking the partition as not being served. This may cause temporary loss of availability to the data in that partition.

As shown at block 904, the corrupt partition is recovered into a consistent partition state. The system can either: (a) repair the partition, since all prior changes to the partition have been stored in the append-only store, which will restore the partition without losing any data; or (b) roll back the partition to a prior point in time, which could potentially cause loss of the changes that occurred between the rolled back time and the time of the failure. Once the partition is repaired, the partition is available to be served again for reading and writing of the structured data.

During partition rollback, the system finds the most recent checkpoint, which is still in valid state, and uses the checkpoint along with the corresponding logs, if they are still present, to rebuild the partition state.

During partition rollback, in some cases, the present metadata and data contents of the partition is insufficient to recover the partition state. In those cases, the system uses the data from other related partitions, including the parent(s) of the target partition during the most recent split or merge that involves the target partition. More specifically, the system reconstructs the state of the partition by merging the state of the most recent valid checkpoints from the parent partitions and the target partition.

After all the partitions have been recovered or rebuilt, the partition map is revised to match the key ranges of all the partitions in the reconstructed system, as shown at block 906. This brings the system back into a global consistent state.

Partition Versioning and Upgrade

When performing an upgrade of the table server code, the upgrade is performed on only a subset of the table servers at a time. As such, the table servers are broken into N upgrade domains, and each upgrade domain may be upgraded one at a time.

Referring to FIG. 10, a flow diagram is provided that illustrates a method 1000 for partition versioning during an upgrade in accordance with an embodiment of the present invention. As shown at block 1002, partitions may be moved from table servers within a target upgrade domain that is to be upgraded next during the upgrade process. A new table server code version is deployed to the table servers within the target upgrade domain, as shown at block 1004.

During the upgrade process, partitions may be assigned to table servers having the new table server code version and start to be modified with potentially a new data format, as shown at block 1006. After this modification, the partitions can only be served by the newer upgraded table servers and may not be served by older version table servers. As such, once a partition has been served by a table server of version N, the system ensures that partitions are only served by a table server of version N or later (or otherwise compatible table server version), as shown at block 1008.

This may be accomplished in a number of different manners within the scope of embodiments of the present invention. For instance, in one embodiment, a version number is tracked of for each partition, table server and table master. When an upgrade occurs, if the table server serving the partition is at higher version number, the partition takes on that version number. From that point on, the partition can only be served by table servers of that version or higher.

In another embodiment, as soon as each table server is upgraded, the table server communicates to the table master to indicate its version. The table master tracks the latest table server version, and partitions to be assigned can only be assigned to table servers with the latest version (or otherwise compatible version).

In yet another embodiment, the partition version is persisted along with the partition metadata. Table servers notify the table master of the versions of the partitions assigned to them. Table servers also report their own version numbers to the table master. The table master thereby keeps track of the partition versions as well as the table server versions. In that way, the table master ensures that partitions can be assigned to the table servers of compatible versions.

CONCLUSION

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method implemented by one or more computing devices within a structured storage system in which structured storage is represented by one or more tables, each table including a plurality of rows, each row representing a data entity stored by the structured storage system and including one or more keys for identifying the row, the plurality of rows being divided among a plurality of partitions, each partition including a range of rows from the plurality of rows within the table, wherein the plurality of partitions are stored on a plurality of table servers, and wherein a table master controls partition assignment to the plurality of table servers, the method for splitting a partition assigned to a table server of the plurality of table servers into child partitions and comprising:

identifying the partition for the splitting of the partition based on load information for the partition, wherein the load information includes information specifying an amount of load tracked on the partition from actual read and write requests made on each of two or more portions of the partition;

determining, by the table master, a split ratio for the splitting of the partition based on a distribution of the amount of the load tracked on the partition such that the split ratio specifies a load distribution that represents a point in the partition in which a first portion of the partition includes a first portion of the amount of load tracked across the partition and a second portion of the partition includes a second portion of the amount of load tracked across the partition;

providing a request to the table server for key information indicating an actual location within the partition for the splitting that corresponds to the load distribution specified by the split ratio, the request includes the split ratio;

receiving the key information at the table master from the table server, the key information indicating the actual location within the partition;

sending a split request from the table master to the table server, the split request indicating to the table server to perform the splitting of the partition based on the key information;

performing the splitting of the partition at a location corresponding to the actual location to create the child partitions;

notifying the table master that the splitting has completed; and updating a partition map based on the partition being split into the child partitions, the partition map storing mappings between the plurality of partitions and the plurality of table servers serving the plurality of partitions.

2. The method of claim 1, wherein the method further comprises constructing, at the table master, a stream for at least one of the child partitions.

3. The method of claim 1, wherein the splitting of the partition comprises:

ceasing to serve the partition from the table server;

building the child partitions from the partition; and loading and serving the child partitions from the table server.

4. The method of claim 3, wherein ceasing to serve the partition comprises making a checkpoint of the partition, thereby reducing the amount of logs to be replayed during partition reload.

5. The method of claim 4, wherein making the checkpoint of the partition comprises efficient truncation of log streams during checkpoint by atomically:

creating a new log stream, hard-linking extents after the checkpoint from an old log stream to the new log stream, deleting the old log stream, and renaming the new log stream to a name of the old log stream.

6. The method of claim 3, wherein building the child partitions from the partition comprises efficient construction of streams of the child partitions by atomically hard-linking extents from streams of the partition without expensive data copy.

7. The method of claim 1, wherein the method further comprises assigning at least one of the child partitions to a second table server.

8. The method of claim 7, wherein the method further comprises updating the partition map to indicate that the at least one of the child partitions is located at the second table server.

9. The method of claim 1, wherein the method further comprises adjusting boundaries of the two or more portions of the partition based on the load information by merging or splitting at least a subset of the two or more portions of the partition for load monitoring purposes.

10. One or more computer-storage media storing computer-usable instructions for performing a method for managing a structured storage system represented by one or more tables, each table including a plurality of rows, each row representing a data entity stored by the structured storage system and including one or more keys for identifying the row, the plurality of rows being divided among a plurality of partitions, each partition including a range of rows from the plurality of rows within the table, wherein the plurality of partitions are stored on a plurality of table servers, and wherein a table master controls partition assignment to the plurality of table servers, the method for merging at least two partitions of the plurality of partitions of the table into a merged partition and comprising:

tracking load information for the plurality of partitions on the plurality of table servers, wherein the load information indicates an amount of load tracked across the partition for each of the plurality of partitions from actual traffic read and write access requests made on the partitions on the table servers;

determining, by the table master, the at least two partitions to merge into the merged partition based on a distribution of the amount of load tracked across the partition for each of the at least two partitions compared to the amount of load for others of the plurality of partitions; and performing the merging based on the determining of the at least two partitions, the merging comprising:

creating, by the table master, a metadata stream for the merged partition;

offloading the at least two partitions from at least one table server serving the at least two partitions based on the determining by the table master;

assigning, by the table master, the merged partition to a selected table server from the plurality of table servers; and loading and serving the merged partition at the selected table server.

11. The one or more computer-storage media of claim 10, wherein the at least two partitions are stored on the same table server.

12. The one or more computer-storage media of claim 10, wherein the selected table server comprises a table server on which at least one of the at least two partitions resided before being merged into the merged partition.

13. The one or more computer-storage media of claim 10, wherein the method further comprises updating a partition map based on the at least two partitions being merged into the merged partition, the partition map storing mappings between the plurality of partitions and the plurality of table servers serving the plurality of partitions.

14. The one or more computer-storage media of claim 10, wherein the method further comprises sending a prepare-merge message from the table master to the at least one table server serving the at least two partitions, wherein the prepare-merge message causes the at least one table server to compact the at least two partitions prior to merging in order to reduce load time for the merged partition.

15. One or more computer-storage media storing computer-usable instructions for performing a method for managing a structured storage system represented by one or more tables, each table including a plurality of rows, each row representing a data entity stored by the structured storage system and including one or more keys for identifying the row, the plurality of rows being divided among a plurality of partitions, each partition including a contiguous range of rows from the plurality of rows within the table, wherein the plurality of partitions are stored on a plurality of table servers, and wherein a table master controls partition assignment to the plurality of table servers, the method for splitting a partition of the plurality of partitions of the table into at least two child partitions and comprising:

tracking load information for the plurality of partitions on the plurality of table servers, wherein the load information comprises an amount of load tracked on each of the plurality of partitions from actual traffic read and write access requests made on the plurality of partitions;

determining by the table master, to perform the splitting of the partition by analyzing the amount of load tracked on the partition from the load information, wherein the load information for the partition identifies different loads on different portions of the partition;

determining, at the table master, a split ratio for the splitting of the partition, wherein the split ratio is determined based on a distribution of the amount of load tracked across the partition such that the split ratio specifies a load distribution that represents a point in the partition in which a first portion of the partition includes a first portion of the amount of load tracked across the partition and a second portion of the partition includes a second portion of the amount of load tracked across the partition;

sending a request from the table master to the table server, the request being for key information identifying an actual location in the partition for the splitting that corresponds to the load distribution specified by the split ratio, the split ratio being included in the request;

determining based on the split ratio specified in the request, by the table server, the actual location in the partition for the splitting by attempting to match the load distribution specified by the split ratio;

communicating the key information from the table server to the table master for the splitting; and constructing, at the table master, a metadata stream for each of the child partitions;

sending a split request from the table master to the table server, the split request indicating to the table server to perform the splitting of the partition based on the key information;

performing the splitting in response to the table server receiving the split request, the splitting comprising:

building, at the table server, the child partitions from the partition;

ceasing to serve the partition at the table server; and loading and serving the child partitions at the table server;

sending a split completion notification from the table server to the table master that indicates completion of the splitting; and updating a partition map based on the partition being split into the child partitions by the splitting, the partition map storing mappings between the plurality of partitions and the plurality of table servers serving the plurality of partitions.

16. The one or more computer-storage media of claim 15, wherein the method further comprises assigning at least one of the child partitions to a second table server.

17. The one or more computer-storage media of claim 16, wherein the method further comprises updating the partition map to indicate that the at least one of the child partitions is located at the second table server.

18. The method of claim 15, wherein ceasing to serve the partition comprises making a checkpoint of the partition, thereby reducing the amount of logs to be replayed during partition reload.

19. The method of claim 18, wherein making the checkpoint of the partition comprises efficient truncation of log streams during checkpoint by atomically: creating a new log stream, hard-linking extents after the checkpoint from an old log stream to the new log stream, deleting the old log stream, and renaming the new log stream to a name of the old log stream.

20. The method of claim 15, wherein building the child partitions from the partition comprises efficient construction of streams of the child partitions by atomically hard-linking extents from streams of the partition without expensive data copy.

* * * * *